US005380034A

United States Patent [19]

Wilson

[11] Patent Number: 5,380,034

[45] Date of Patent: Jan. 10, 1995

[54] WHEELCHAIR WITH CONVERTIBLE SEAT-STRETCHER

[75] Inventor: Harold R. Wilson, Holland, Mich.

[73] Assignee: Love Lift, L.P., Holland, Mich.

[21] Appl. No.: 943,829

[22] Filed: Sep. 11, 1992

[51] Int. Cl.$^{6}$ .......... B62B 3/02

[52] U.S. Cl. .......... 280/657; 280/30; 297/DIG. 4; 297/29

[58] Field of Search .......... 280/30, 640, 657; 297/DIG. 4, 16, 19, 29, 30; 4/450, 480; 5/600, 618, 619, 81.1

[56] References Cited

U.S. PATENT DOCUMENTS 2,681,455 6/1954 Schwartz .
2,694,437 11/1954 Glaser .......... 280/657
3,285,619 11/1966 Kitrell et al. .
3,611,449 6/1970 Berry .......... 4/134
4,007,959 2/1977 Juergens .......... 297/42
4,067,409 1/1978 DiMatteo et al. .......... 297/417
4,240,169 12/1980 Ross .......... 5/60
4,255,823 3/1981 Boyer et al. .......... 5/81
4,266,305 5/1981 Kavaloski et al. .......... 4/480
4,456,086 6/1984 Wier et al. .......... 297/DIG. 4
4,527,829 7/1985 Fanslau et al. .......... 297/17
4,592,562 6/1986 Strautnieke et al. .......... 280/250.1
4,856,123 8/1989 Henderson et al. .......... 4/480
5,112,076 5/1992 Wilson .......... 280/657

*Primary Examiner*—Richard M. Camby
*Attorney, Agent, or Firm*—Flynn, Thiel, Boutell & Tanis

[57] ABSTRACT

A patient transporting device which is capable of functioning as a wheelchair and as a stretcher. The device has a seat assembly which can also be readily converted, while mounted on the frame, to function as a stretcher. The conversion of the seat assembly into a stretcher shifts the seat forwardly relative to the base as the back is folded down to maintain the center of gravity of a patient more centrally located over the base.

21 Claims, 9 Drawing Sheets

WHEELCHAIR WITH CONVERTIBLE SEAT-STRETCHER

FIELD OF THE INVENTION

This invention relates to an improved patient transporting device which can be used either as a wheelchair or which can be readily converted to function as a stretcher.

BACKGROUND OF THE INVENTION

Various apparatus have been developed to assist in moving, transporting and/or lifting a patient, invalid or other incapacitated person, herein generally referred to as a "patient". Many of the known apparatus have been highly specialized with respect to functional capabilities. For example, many known lifting apparatus are constructed to function primarily for lifting of a patient, and as such often involve some type of boom from which a patient can be suspended in a harness or the like to carry out the lifting function. The general apparatus of this type, however, are generally suitable solely for such lifting function and hence are not suitable for general transporting functions.

Rather, a general transporting function for patients is normally carried out using wheelchairs or like devices. Numerous wheelchairs have been developed for this purpose, including both motorized and manually propelled wheelchairs. Again, however, most wheelchairs are limited with respect to functional capabilities in that they typically provide only mobility or transportability from one location to another, and are unable to successfully perform other necessary functions, such as assisting in patient transfer, lifting and the like.

One attempt to provide a wheelchair of improved functional capability is illustrated in my U.S. Pat. No. 5,112,076. This latter patent illustrates therein an improved wheelchair which is believed highly desirable with respect to the capability to not only provide significant mobility in terms of transporting a patient from one location to another, but also provides significantly improved performance with respect to facilitating lifting and lowering of a patient seated in the wheelchair, and transferring of the patient from or to the wheelchair, such as between the wheelchair and a bed, due to the features of the seat assembly and its ability to be readily disconnected from the chair and positioned on a bed.

Another attempt to provide for improved performance capability of a patient transporting device is illustrated in U.S. Pat. No. 4,255,823 which illustrates a transporter which functions as a wheelchair. The wheelchair includes a seat assembly which can be raised and lowered and which can also be converted to lay generally flat so as to function as a stretcher. In the device of this latter publication, however, the entire seat assembly is pivotally supported in a cantilevered fashion solely at a single pivotal connection disposed at one side of the seat assembly substantially at the hinge between the seat and back, which hinged connection itself is provided on the free end of a single vertically-swingable support arm which controls movement of the seat assembly. This creates structural problems in terms of strength and stability due to the cantilevered support of the seat assembly. Further, when the seat assembly is folded horizontally into a stretcher position, the support of the stretcher as provided by the cantilevered connection between the arm and the hinge point between the seat and back results in a significant portion of the stretcher being cantilevered outwardly a significant distance beyond the wheels which support the base, and in fact the center of gravity of the patient is no longer centered generally over the base but is positioned rather precariously adjacent one side of the base, which can cause undesired instability and potential tipping.

Accordingly, it is an object of this invention to provide an improved patient transporting device which is capable of functioning as a wheelchair, as a patient lifting and transfer device, and as a stretcher, and which overcomes disadvantages associated with prior devices as briefly explained above.

More specifically, this invention relates to an improved patient transporting device which is constructed similar to and functions in the manner of a wheelchair, and which is constructed similar to and incorporates numerous advantages associated with the wheelchair of my aforesaid U.S. Pat. No. 5,112,076. In the improved device of this invention, however, the seat assembly can also be readily converted, while mounted on the frame of the device, so as to function as a stretcher. The conversion of the seat assembly into a stretcher can be readily and safely accomplished by an assistant and, when the seat assembly is converted into a stretcher, the support of the seat assembly is such as to enable the seat to be shifted forwardly relative to the base as the back is folded down to maintain the center of gravity of the patient, when disposed on the stretcher, more centrally located over the base to maintain desired stability of the device.

This invention also relates to an improved patient transporter which functions as a wheelchair and can be readily used in conjunction with a standard toilet.

Other objects and purposes of the invention will be apparent to persons familiar with devices of this general type upon reading the following specification and inspecting the accompanying drawings.

Figure 1:
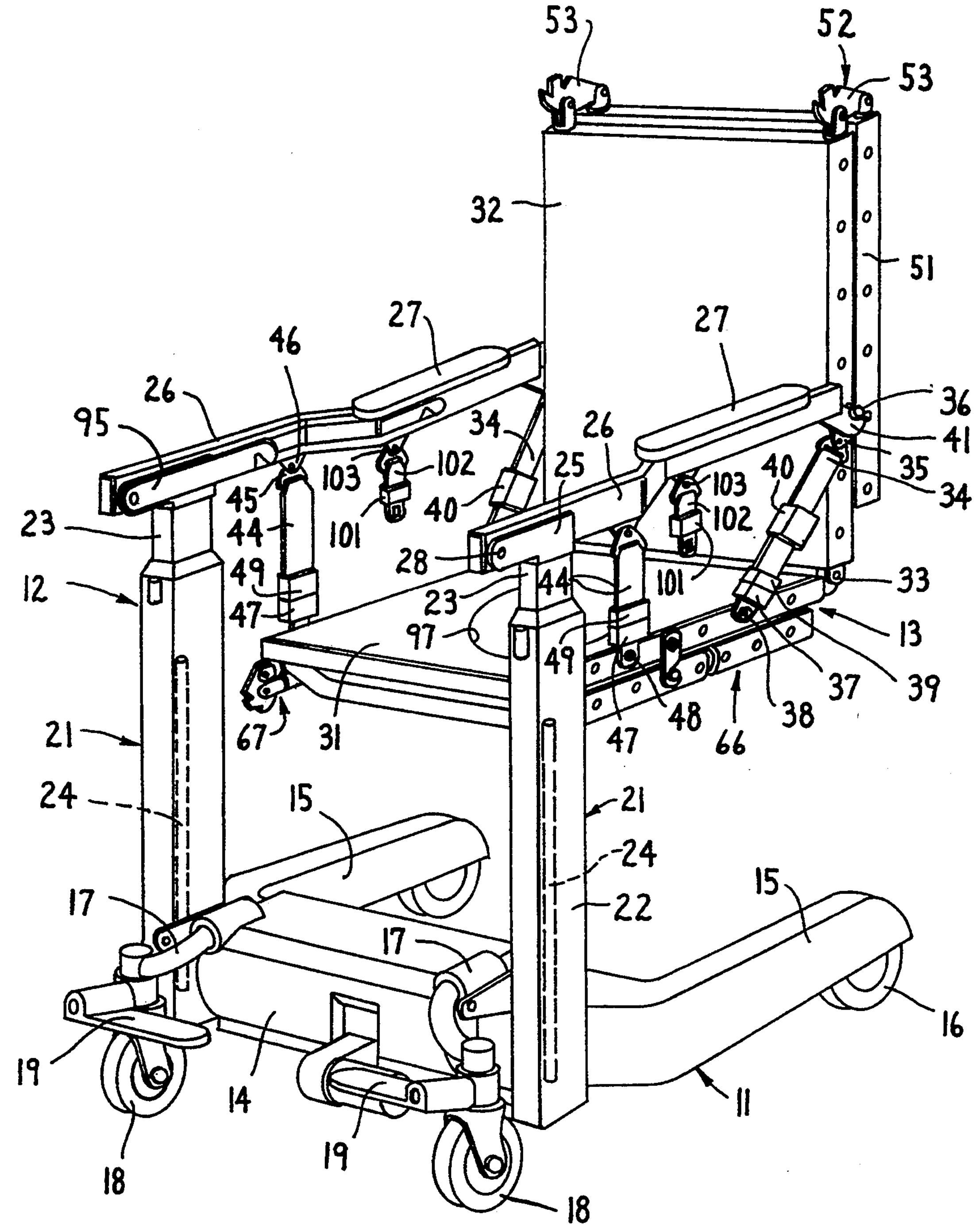
FIG. 1 is a perspective view of one embodiment of a patient transporter according to the present invention, with the transporter configured as a wheelchair.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the side of the transporter or wheelchair through which the occupant normally enters or exists the chair, this being the left side in FIGS. 1, 3, 7 and 8. The words "inwardly" and "outwardly" will refer to directions toward and away from, respectively, the geometric center of the transporter and designated parts thereof. Said terminology will include the words specifically mentioned, derivatives thereof, and words of similar import.

DETAILED DESCRIPTION

Figure 2:
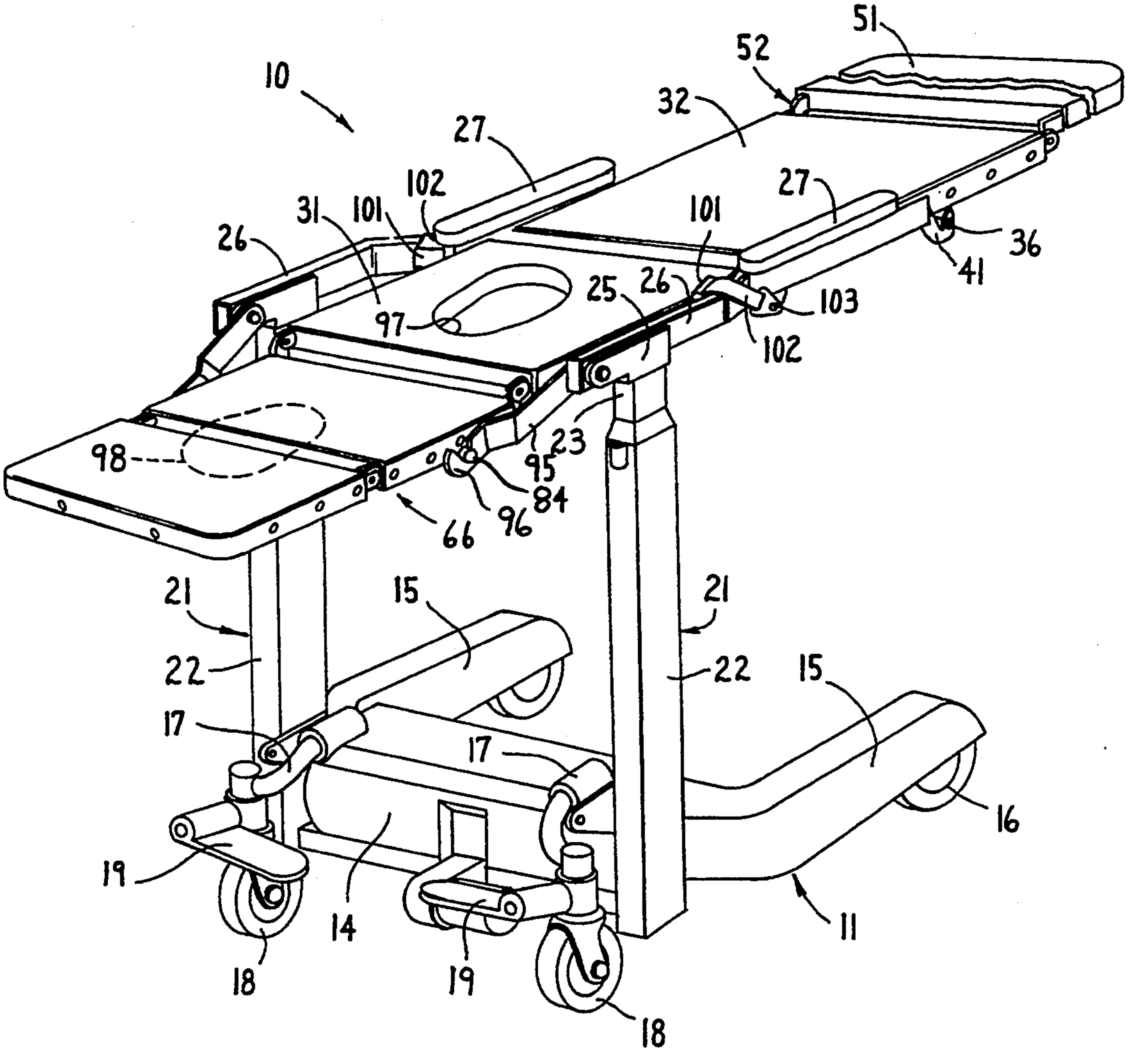
FIG. 2 is a perspective view similar to FIG. 1 but showing the transporter configured as a stretcher.
Figure 3:
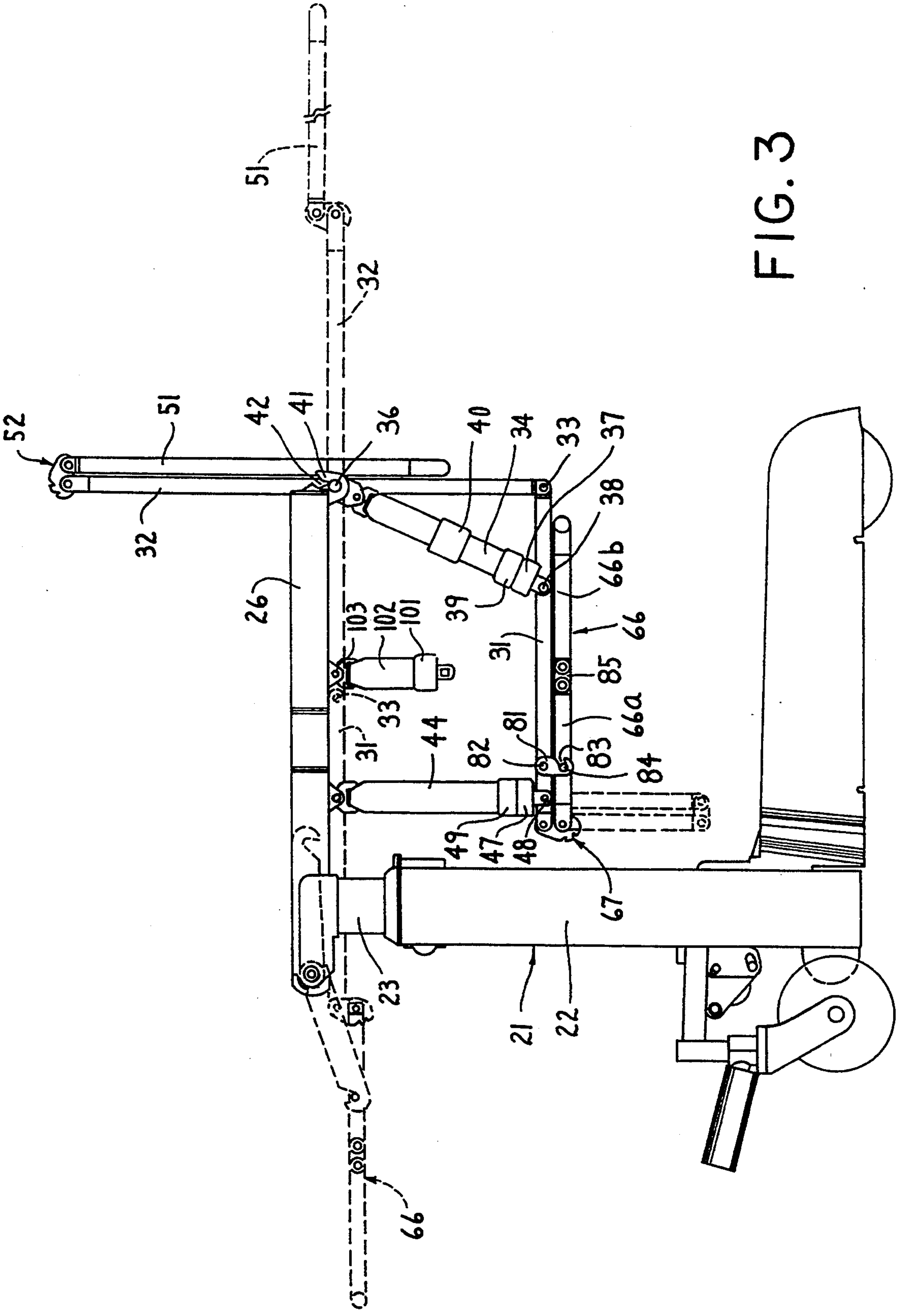
FIG. 3 is a side elevational view showing the seat assembly configured for use both as a wheelchair and as a stretcher.

Referring to FIGS. 1–3, there is illustrated one embodiment of a patient transporter 10 according to the present invention, which transporter has the seat assembly configured so as to function as a wheelchair in FIG. 1, and has the seat assembly configured to function as a stretcher in FIG. 2.

The transporter 10 includes a wheel base assembly 11 having an upright assembly 12 projecting upwardly therefrom. This upright assembly 12 in turn mounts thereon a removable seat/stretcher assembly 13 (hereinafter referred to as the "seat assembly" for convenience), the latter being used for receiving an occupant-/patient both for transporting by the transporter, either when used as a wheelchair or as a stretcher, and transfer to and from the transporter.

The wheeled base assembly 11 includes a generally rigid and rearwardly-opening U-shaped base defined by a bight 14 which extends horizontally and transversely across the transporter adjacent the front side thereof, which bight has opposite ends thereof fixed to generally parallel and rearwardly projecting cantilevered side legs 15. These legs 15 are sidewardly spaced apart and define an enlarged rearwardly-opening space therebetween to permit the base to straddle a toilet or the like. Each side leg 15 has a conventional wheel or roller 16 mounted adjacent the rear free end thereof.

The base assembly 11 also has a pair of front side support arms or legs 17 which project forwardly a small extent in cantilevered relationship from the bight 14. These arms 17, adjacent the free ends thereof, mount thereon front support-rollers 18, the latter preferably being of the caster type. These front support arms also mount thereon right and left footrests 19, the latter being pivotally swingable upwardly into upright storage positions if desired. The structure of the footrest 19 is conventional.

The upright structure 12 includes a pair of vertically elongate and telescopic support post assemblies 21 each including a vertically elongate lower post 22 which has the lower end fixed to the base and which projects upwardly in cantilevered relationship therewith. A vertically elongate upper post 23 is slidably telescopically positioned within and projects upwardly out of the lower post. A suitable drive or lifting unit 24 is disposed interiorly of each post assembly, which drive unit normally comprises a ball-screw drive unit having a vertically elongate screw which is rotatably supported relative to the lower post and which projects upwardly for engagement with a nut assembly which is secured to the upper post. This drive screw unit 24 is driven through suitable gearing from a rotatable cross shaft supported within the bight 14, which cross shaft in turn is driven from a suitable battery-powered drive motor mounted within the bight 14. The details of a typical drive for extending and contracting the support posts 21 is illustrated in detail in my aforesaid U.S. Pat. No. 5,112,076.

The support post assemblies 21 are disposed adjacent opposite sides of the transporter adjacent the front corners thereof, and at upper ends thereof are respectively joined to horizontally elongate seat support arms 26. Each arm 26 is, adjacent its front end, supported within and joined, as by a hinge pin 28, to a bracket 25 secured to the upper end of the respective upper support post 23. The pair of support arms 26 then project rearwardly in cantilevered relationship away from the support post assemblies in generally parallel relationship adjacent opposite sides of the transporter. The arms 26 are normally maintained in a generally horizontal rearwardly projecting rigid and stationary relationship due to their support within the brackets 25, although the arms 26 can be hingedly moved upwardly and forwardly when collapsing of the transporter is desired, such as for storage purposes. Each of the support arms 26 may be provided with a suitable padded armrest 27 thereon if desired.

Considering now the seat/stretcher assembly 13, same includes a seat portion 31 and a backrest portion 32, the latter being pivotally joined by a suitable horizontally-extending hinge structure 33 for enabling the backrest portion 32 to be swung downwardly to be substantially aligned and flat with the seat portion as indicated by FIGS. 2 and 3. This hinge 33, however, has a suitable stop which prevents the backrest portion 32 from swinging downwardly beyond the aligned position, that is downwardly beyond the dotted line position illustrated by FIG. 3.

To maintain the backrest portion 32 in an upright transverse and preferably approximately perpendicular relationship relative to the seat portion 31, there is provided a pair of side supports 34 which are provided for joining the seat and back portions 31 and 32 together in the desired angled relationship. Each side support 34 is preferably formed as an elongate flexible strap arrangement having a clip or bracket 35 at the upper end thereof which has an opening therethrough for pivotal engagement with a securing pin 36 which is fixed to and projects outwardly from a side frame element of the backrest portion 32. This securing pin 36 is spaced upwardly a substantial distance from the hinge 33 and is preferably disposed in the vicinity of the free end of the respective support arm 26. The other end of side support 34 has a separate clasp or buckle assembly which includes a buckle part 37 which has a hole therethrough for pivotal engagement with a further securing pin 38 which is fixed to and projects outwardly from a side frame element of the seat portion 31. The part 37 is releasably engageable with a buckle part 39 secured to the lower end of the strap, whereby parts 37 and 39 function like a conventional vehicle-type seat belt buckle or clasp. The securing pin 38 is disposed forwardly from the hinge 33 so as to be located intermediate the front and rear edges of the seat portion 31. Each side support 34 also preferably has a strap length adjuster 40 associated therewith.

To support the seat/stretcher assembly 13 from the upright assembly, the rearward free ends of the arms 26 are provided with claws or hooks 41 which define therein groove-like notches 42 which open upwardly so as to supportingly and pivotally engage the securing pins 36 which projects sidewardly from the backrest portion 32. The pins 36 are normally positively maintained within the notches 42 by pivoted latching elements (not shown), which elements are described in my aforesaid U.S. Pat. No. 5,112,076.

The seat/stretcher assembly 13 is additionally supported adjacent opposite sides thereof by a pair of flexible front supports 44 which supportingly suspend the forward part of the seat portion 31 from the support arms 26. Each flexible front support 44 again preferably comprises a flexible length-adjustable support strap arrangement provided with a clip or bracket 45 at the upper end which is pivotally engaged with a pivot pin 46 which is secured to a bracket fixed to the respective support arm 26. A conventional releasable clasp or buckle assembly is provided at the lower end of the flexible support 44 and includes a buckle part 47 which is hingedly engaged with a further securing pin 48 which is fixed to and projects sidewardly from a side frame element of the seat portion 31. This pin 48 is disposed more closely adjacent a front edge of the seat portion. The buckle part 47 is releasably engageable with a clasp or buckle part 49 provided in the lower end of the strap, which buckle part is of conventional construction so as to permit the length of support 44 to be adjusted, and at the same time permits the buckle part 49 to be physically separated from the part 47 if desired.

The above-described arrangement provides a generally four-point support adjacent each side of the transporter. That is, the pins 36, 38, 46 and 48 maintain the assembly 13 as a seat arrangement. When so positioned, however, the hinge pins or points 33, 36, 46 and 48 preferably define a parallelogram to enable the assembly 13 to be moved from a seat arrangement into a stretcher arrangement, as described below.

Figure 6:
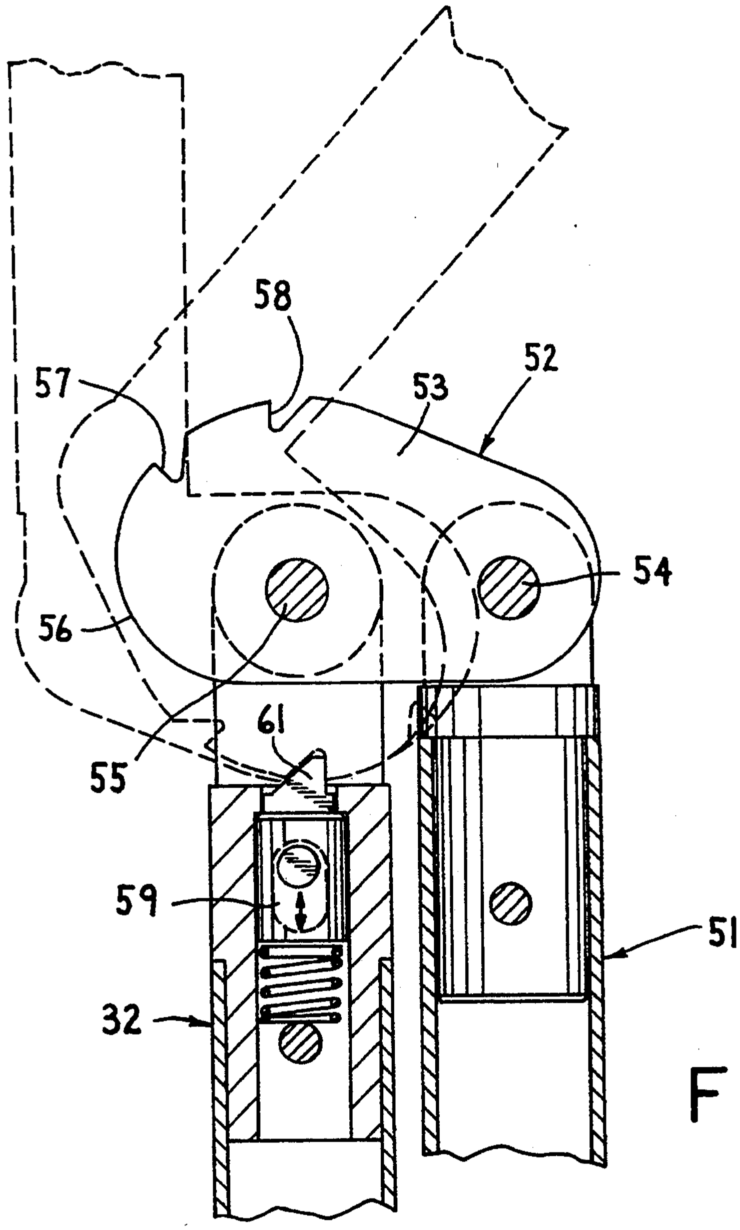
FIG. 6 is a similar view illustrating the latch between the back and headrest portions of the seat assembly.
Figure 10:
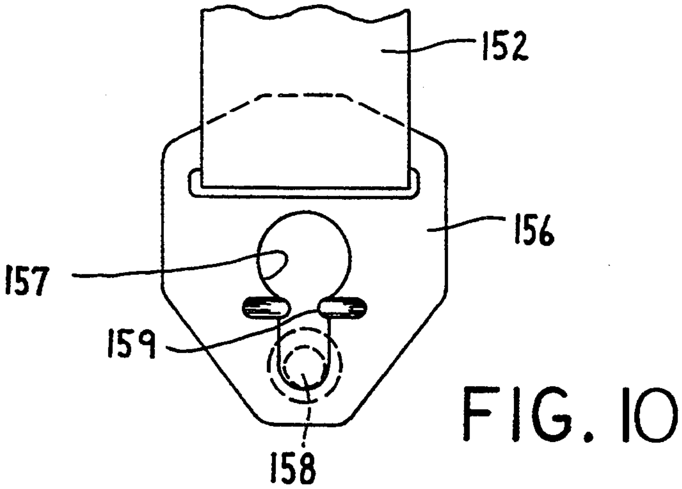
FIG. 10 is an enlargement of a releasable clip.

The seat/stretcher assembly 13 also preferably includes an enlarged headrest portion 51 which is joined by a hinge assembly 52 to the upper free edge of the backrest portion 32. The hinge assembly 52, as illustrated by FIG. 6, includes a bracket plate 53 which is fixedly secured by a joining pin 54 to one edge of the headrest portion 51. The bracket plate 53 projects sidewardly so as to overlap the upper edge of the headrest portion 32 and is joined thereto by a generally transversely horizontally projecting hinge or pivot pin 55. Each bracket plate 53 has an exterior cam profile 56 provided with a pair of latch-receiving notches 57 and 58 disposed in spaced relationship along the periphery thereof for engagement with a latch 59 as movably provided on the side frame element of the backrest portion 32 adjacent the upper free edge thereof.

The latch 59 has a latching projection 61 which projects outwardly for slidable engagement along the cam edge 56 and for engagement within the notches 57 or 58, which latching projection 61 has a sloped cam profile on one side to facilitate its movement along the cam surface and into the notch, and a transverse shoulder surface on the rear side to prevent it from moving out of the notch. The latch 59 has a manually-gripable actuator pin 62 which projects sidewardly through a slot 63 so as to be manually-gripable to permit manual slidable retraction of the latch 59 in opposition to the urging of a spring 64.

The headrest 51 is normally maintained in a storage position wherein it is disposed directly rearwardly of the backrest portion 32, as indicated by solid lines in FIG. 6. When it is desired to position the headrest portion 51 in an operative location, then the headrest portion is manually gripped and swung upwardly about the hinge pin 55. As the bracket 53 swings about the hinge pin 55, the cam surface 56 moves into engagement with and effects depression of the latch 59 until the latch aligns with and is spring urged into the first notch 57, which hence locks the headrest in a intermediate position wherein the headrest projects upwardly and is rearwardly tilted at an angle of about 45°. By continuing to swing the headrest 51 forwardly, the latch projection 61 can be cammed out of the notch 57 and will slide along the cam profile until engaging the notch 58, thereby latching the headrest in the fully upright position wherein it is disposed in generally parallel but upwardly spaced relationship relative to the backrest. In the fully upright position, the headrest 51 is normally spaced slightly forwardly from the backrest 32. The headrest is normally maintained in this latter position relative to the backrest when the assembly 13 is used as a stretcher, as indicated by dotted lines in FIG. 3.

The seat/stretcher assembly 13 also includes a legrest portion 66 which is typically stored in a storage position directly under the seat assembly 31. A hinge assembly 67 cooperates between the front edge of the seat portion 31 and the adjacent edge of the legrest portion 66 to enable the legrest portion to be swung generally through an angle of about 180° between the storage position of FIG. 1 and the stretcher position of FIGS. 2 and 3, in which latter position the legrest portion 66 projects generally outwardly in parallel relationship with the seat portion 31.

Figure 4:
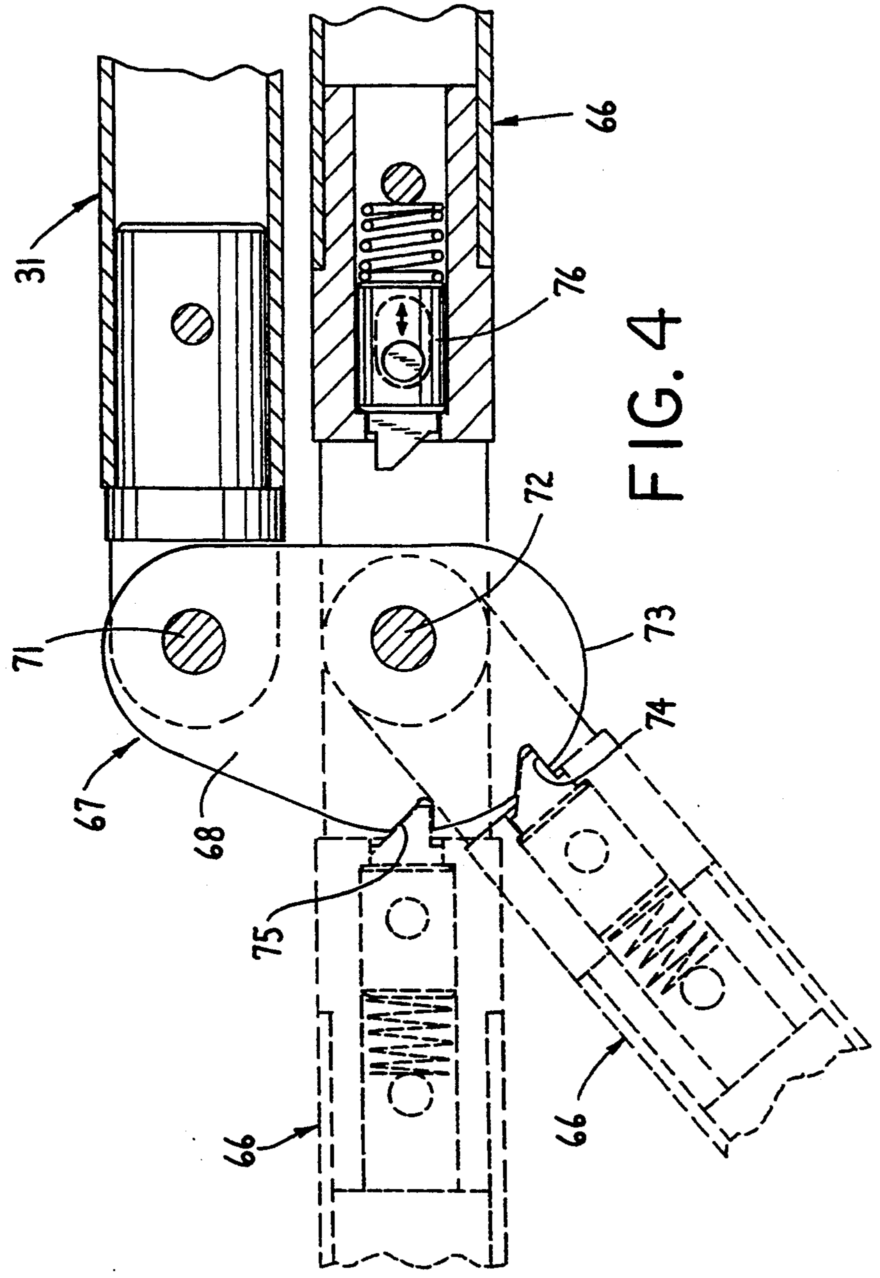
FIG. 4 is a fragmentary sectional view of the latch which cooperates between the seat and legrest portions of the seat assembly.
Figure 5:
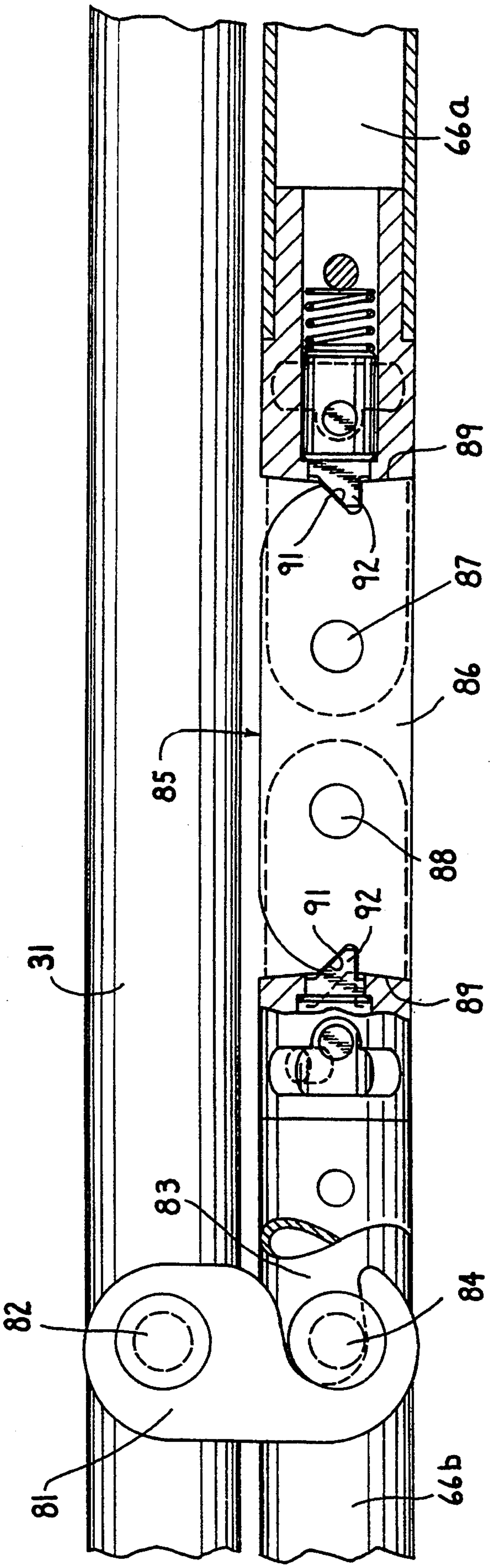
FIG. 5 is a similar view which illustrates the latch between the bi-fold portions of the legrest.

The hinge assembly 67 for connecting the seat and legrest portions, as illustrated in FIG. 4, includes a bracket or plate 68 which is fixedly secured to the front end of each side frame element of the seat portion 31 by a connecting pin 71. This bracket plate 68 projects downwardly and in turn is joined by a horizontal hinge pin 72 to the adjacent end of the side frame element associated with the legrest portion 66. The bracket plate 68 has a cam profile 73 defined on the edge thereof provided with a pair of spaced latch-receiving notches 74 and 75, which are intended to cooperate with the latching projection associated with the spring urged latch 76, the latter being slidably supported on the adjacent free end of the side frame of the legrest portion 66. The construction of the hinge assembly and latch illustrated in FIG. 4 is similar to that illustrated by FIG. 6, described above.

The seat assembly 66 is normally maintained in a storage position below the seat portion 31, and there is provided a releasable securing means 79 which cooperates between each side of the seat portion 31 and the adjacent side of the legrest portion 66. This releasable securing means includes an arm 81 which is joined by a pivot 82 to the adjacent side frame element of the seat portion 31. This arm 81 has a hook 83 at the free end thereof engageable with a pin 84 which projects sidewardly from the adjacent side of the legrest portion 66 for normally maintaining the legrest portion in a storage position wherein it is disposed directly under the seat portion.

When use of the legrest portion is desired, the securing arms 81 are manually swung upwardly to release the pins 84, thereby enabling the legrest portion 66 to be swung downwardly about the hinge pins 71 and thence forwardly and upwardly until the latch 76 engages either the notch 74 or the notch 75. When the latch is engaged with the notch 75, then the legrest portion is locked in a raised position of use wherein it projects generally horizontally forwardly away from the front edge of the seat portion in generally parallel relationship therewith.

To permit movement of the legrest portion 66 from the storage position into the use position, the drive units associated with the telescopic support post assemblies 21 are energized to extend the port assemblies and raise the seat assembly 13, thereby providing additional clearance under the seat assembly to facilitate the forward swinging of the legrest portion 66 into the upright position of use. While the legrest portion 66 is preferably constructed generally as a one-piece assembly having rigidity between the front and rear edges thereof, nevertheless it can be of a bi-fold construction if preferred and as illustrated by FIGS. 1 and 3 to permit forward swinging while minimizing the required height clearance. In this bi-fold construction of the legrest assembly 66, the legrest portion includes front and rear portions **66*a* and 66*b* which are respectively provided with transverse hinge pins 87 and 88 secured to the respective side frame elements, and these hinge pins are joined by a bracket plate 86 which adjacent opposite ends has a cam profile provided with a notch 91 for engagement with a spring-urged latch 92 as movably supported on the free end of each side frame portion. When the legrest portion is disposed with front and rear portions 66*a* and 66*b* aligned, either in the storage position or in the use position, the latches 92 engage the notches 91 in the bracket 86 to create a rigid connection between the front and rear portions 66*a* and 66*b*. This rigidly is further assisted by the fact that the cams effectively define abutments 89 which abut against the end of the respective rail. By manually retracting the two opposed latches 92 so as to disengage them from the notches 91, then the legrest portions 66*a* and 66*b* can be swingable hinged downwardly about the respective hinge pins 87 and 88 in a manner similar to a bi-fold door so as to enable the legrest portion to be swung downwardly and forwardly, substantially as illustrated by dotted lines in FIG. 3, and then moved outwardly so as to be latched in an aligned upright position, also as indicated by dotted lines in FIG. 3**.

To convert the transporter 10 from a seat as illustrated by FIG. 1 into a stretcher as illustrated by FIG. 2, the headrest 51 is swung upwardly 180° and latched in the upright position, and the legrest 66 is released from the securing arms 81 and swung forwardly 180° so as to be latched generally in the forwardly projecting horizontal position wherein it projects forwardly from the seat portion 31. An assistant then manually releases the buckle parts 39 as associated with the side supports 34 from the buckle parts 37. This leaves the seat assembly pivotally supported by a parallelogram four-point support defined by the hinges 33, 36, 46 and 48. The assistant then grasps the backrest portion 32 adjacent the upper ends thereof and manually pushes the backrest portion 32 rearwardly and downwardly about the hinge pin 36, which movement can be assisted by also effecting lifting on the seat portion 31. This causes the backrest portion 32 to be swung about the hinge 36 generally into a horizontal position, and simultaneously the seat portion 31 is lifted upwardly while remaining generally horizontal, which upward lifting is accompanied by forward displacement of the seat portion 31 so that the portion 31 then projects forwardly outwardly between the post assemblies 21, with the seat portion 31 and backrest portion 32 assuming a generally horizontally aligned position disposed at an elevation closely adjacent but generally slightly below the arms 26.

Upon reaching this horizontally aligned relationship, then the support arms 95, which are joined at one end to the arms 26 by the hinges 28, are manually swung outwardly from the dotted-line storage position of FIG. 3 so as to cause the hooks 96 as provided at the free ends of the arms 95 to engage the outer ends of the pins 84 to assist in supporting the seat portion 31 in the raised stretcher position. In addition, an auxiliary clasp or buckle part 101, which is secured to the lower end of strap 102 as suspended from each arm 26 at pivot 103, is moved upwardly past the outside of the respective arm 26 and is then moved inwardly and downwardly over the arm 26 and is joined to the previously separated buckle part 37. This locks the aligned back and seat portions 31 and 32 in the raised stretcher position. The stretcher arrangement 13 can then be raised or lowered as a unit by respectively extending or contracting the post assemblies 21. Since the vertical region between the seat or stretcher arrangement and the base is entirely opened as it projects rearwardly from the post assemblies, this greatly facilitates use of the transporter in association with a bed or a standard toilet so as to facilitate movement of a patient relative to such facilities.

Further, the seat portion 31 in a preferred embodiment is preferably provided with an oval-shaped opening 97 disposed centrally thereof and extending vertically therethrough, which opening generally corresponds with the opening provided in a standard toilet. Similarly, the underside of the legrest portion 66 is preferably provided with a projection 98 thereon. This projection 98 projects upwardly when the legrest portion 66 is in the storage position beneath the seat portion 31. The projection 98 is sized so as to project upwardly and snugly fit within the opening 97 and hence define a generally smooth contour for the seat portion 31. The legrest portion 66 will be swung downwardly and at least partially forwardly when it is desired to use the seat assembly in conjunction with a standard toilet.

PREFERRED EMBODIMENT

Reference will now be made to FIGS. 7–12 which illustrate a patient transporter according to a preferred embodiment of the invention.

The transporter 110 illustrated by FIGS. 7 and 8 again includes a generally wheeled base 111 to which an upright structure 112 is secured, the latter movably and releasably supporting thereon a seat/stretcher assembly 113.

The wheeled based 111 again includes a generally rearwardly-opening U-shaped base which sits close to the ground and includes a bight 114 extending transversely across the width of the transporter and having cantilevered legs 115 projecting rearwardly in generally parallel relationship, which legs support rear wheels 116 adjacent the rearward ends thereof. Front support arms 117 project forwardly and support thereon front casters 118.

The upright structure 112 includes a pair of generally parallel support post assemblies 121 which are cantilevered upwardly adjacent the opposite sides of the transporter in close proximity to the front corners thereof. These support post assemblies 121 are basically mirror images of one another in that each includes a lower tubular post 122 which has a lower end fixed to the base and projecting upwardly therefrom. The lower posts 122 vertically slidably support upper posts 123 which, at upper ends, are provided with yokelike brackets 124 which connect by horizontal hinges 125 to the front ends of elongate support arms 126. These arms 126 project horizontally rearwardly in cantilevered relationship from the individual support posts, with the arms extending generally parallel so as to be disposed adjacent opposite sides of the seat/stretcher assembly 113.

Each support post 121 has a lifting assembly 127 disposed therein which preferably comprises a ball-screw unit including an elongate screw member 128 which is rotatably support on and extends vertically along the lower post 122 for engagement with a nut 129 which is secured adjacent the lower end of the upper post 123. The lower ends of the drive screws 128 are engaged through suitable bevel gearing with opposite ends of a rotatable cross shaft 129A which extends horizontally through the bight 114, which cross shaft in turn is driven through suitable gearing from a battery-powered drive motor 129B which is activated by a suitable control switch (not shown).

The seat/stretcher assembly 113 includes a horizontally enlarged seat portion 131 connected to a generally vertically enlarged backrest portion 132 through an intermediate horizontally-extending hinge 133 which joins the rearward edge of the seat portion 131 to the lower edge of the backrest portion 132. The assembly 113 also includes a generally vertically-enlarged headrest portion 134 which is joined by a latchable hinge assembly 135 to the upper edge of the backrest portion 132. The assembly 113 also includes a generally horizontally enlarged legrest portion 136 which has one edge thereof joined through a lockable hinge assembly 137 to the front edge of the seat portion 131.

Figure 11:
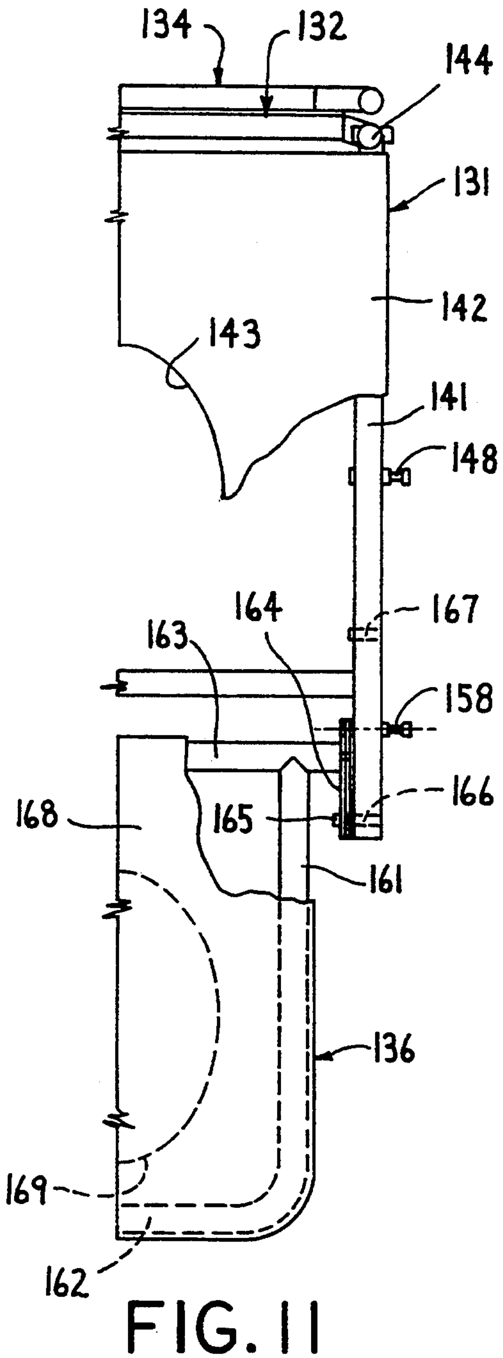
FIG. 11 is a fragmentary plan view of the seat and legrest portions, the latter in its extended or use position.
Figure 12:
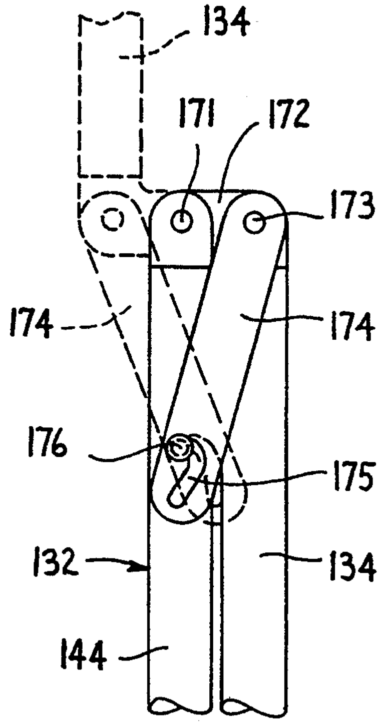
FIG. 12 is a fragmentary elevational view showing the hinge and latch structure which cooperates between the head and backrest portions.
Figure 11A:
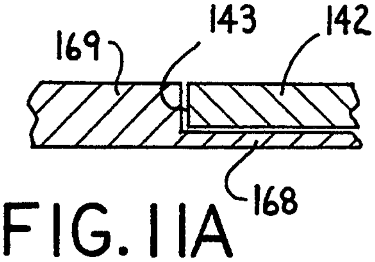
FIG. 11A is a fragmentary sectional view showing how the stored legrest closes off the opening in the seat.

The seat portion 131, as illustrated by FIG. 11, includes generally parallel side frame members 141 extending along opposite side edges thereof, which frame members support a generally horizontally enlarged seat pan 142 which extends therebetween, the latter typically being constructed of a thin sheetlike plastics material. This seat pan 142 is preferably provided with a seat cushion fixedly disposed thereover. The seat pan 142 has an enlarged oval-shaped opening 143 extending centrally therethrough and adapted for alignment with a conventional toilet when the transporter, assembled as a wheelchair, is disposed in straddling relationship thereto a toilet.

The backrest portion 132 also has rigid side frame members 144 extending along opposite side edges thereof in generally parallel relationship, and coupled together by a suitable covering or pan similar to the seat pan 142.

The backrest portion 132 is normally maintained in an upright transverse (for example typically a perpendicular) relationship to the seat portion 131 by a pair of flexible side supports 146 which connect the portions 131–132 adjacent opposite sides of the seat assembly. Each flexible side support 146 is formed generally by an elongate flexible strap assembly provided with securing clips or brackets at opposites ends which respectively hingedly connect to hinge pins 147 and 148. The hinge pin 147 is fixed to and projects sidewardly from the side frame member 144 of the backrest portion 132 at a location disposed upwardly from the horizontal hinge 133, and the other hinge pin 148 is fixed to and projects sidewardly from the side frame member 141 of the seat portion 131 at a location spaced forwardly from the horizontal hinge 133. Both of these hinges 147 and 148 are preferably disposed intermediate the transverse edges of the seat and backrest portions 131 and 132. Each side support 146 also has a conventional belt buckle 149 associated therewith intermediate the ends of the strap to permit the length of the strap assembly to be selectively adjusted.

Figures 8, 9:
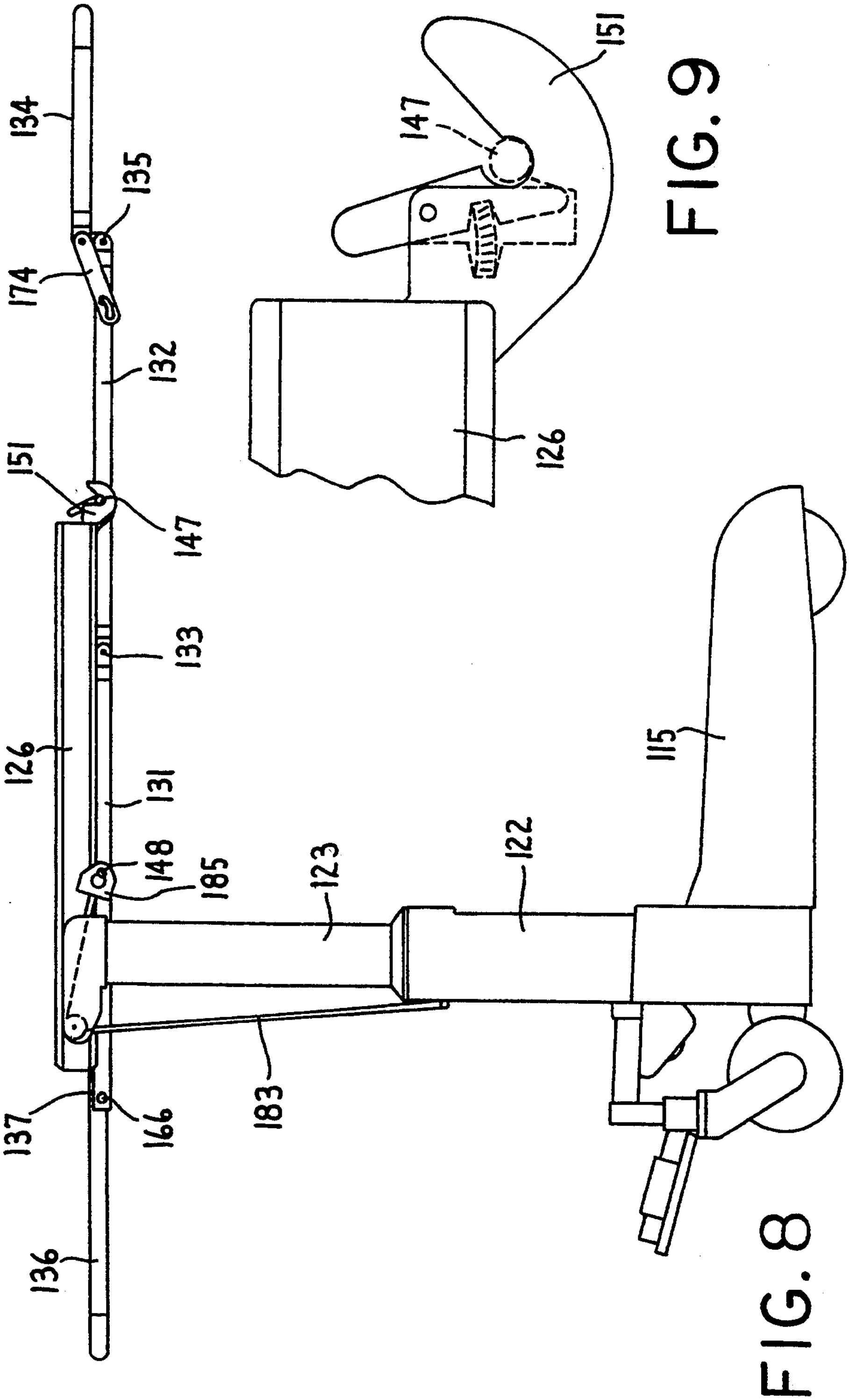
FIG. 8 is a view similar to FIG. 7 but illustrating the transporter in a stretcher position.
FIG. 9 is a fragmentary enlargement of a part of the transporter shown in FIG. 7.

The hinge pins 147 which project outwardly from opposite sides of the backrest portion 132 are also pivotally engaged within hooks 151 which are secured to the rearward free ends of the cantilevered support arms 126, which hooks have spring-urged latching levers associated therewith for normally maintaining the hooks closed so as to secure the hinge pins 147 therein, as shown in FIG. 9. This structure is described in detail in my aforementioned U.S. Pat. No. 5,112,076.

The seat assembly 113 is additionally supported by flexible front supports 152 which suspendingly support the seat portion 131, adjacent the front edge thereof, from the respective support arms 126. Each of the flexible front supports 152 is also preferably formed by a flexible strap arrangement having a bracket or clip at the upper end thereof pivotally supported on a hinge pin 153 associated with a bracket fixed to the underside of the respective support arm 126. The strap associated with the front support 152 also has a buckle 155 associated therewith for permitting the length of the strap to be adjusted in a conventional manner. The lower end of the flexible strap has a bracket or clip 156 thereon provided with a keyhole slot 157 (FIG. 10) which is enlarged at the upper end for permitting passage therethrough of the outer enlarged end of a securing pin 158 which projects sidewardly from the side frame of the seat portion 131 in the vicinity of but spaced rearwardly a small distance from the front edge of the seat portion. This securing pin 158 is positionable in the lower end of the keyhole slot 157 wherein it functions as a hinge pin, and is resiliently retained in the lower end of the keyhole slot by resilient detents or fingers 159 provided on the bracket 156. This bracket 156 can be totally disconnected from the seat portion 131 when desired.

Considering now the construction of the footrest portion 136, it includes a generally U-shaped frame defined by generally parallel side frame legs 161 fixedly joined by a front frame rail 162. The sideward spacing between the side frame legs 161 is somewhat smaller than the width of the seat portion 131, and the rearward ends of the side legs 161 are fixedly secured to a rear cross rail 163. This rear cross rail 163 has the outer ends thereof fixedly secured to pivot plates 164 which are positioned adjacent but inwardly of the seat portion side frame members 141. Each pivot plate 164 is vertically pivotally joined to the adjacent side frame member 141 by the inner end of the securing pin 158. The axis of this pin is located rearwardly of the cross rail 163 when the legrest 136 is in the forward extended position. The pivot plate 164, adjacent the end thereof remote from the hinge pin 158, also mounts thereon a spring-urged latch or lock pin 165 which is selectively insertable into one of two holes 166 and 167 formed transversely through the adjacent side frame member 141, which holes 166 and 167 respectively receive the lock pin for holding the legrest 136 in the forward use and rearward storage positions, respectively.

The legrest portion 136 also includes a shell or cover member 168 which extends over and is secured to the underlying frame, which cover is of a construction similar to the seat cover. This cover 168 has an oval-shaped projection 169 fixed centrally of and projecting outwardly from the underside thereof, which projection projects upwardly into and occupies the oval opening 143 formed in the seat pan 142 when the legrest portion 136 is in the storage position disposed below the seat portion. Since the legrest portion is of somewhat smaller width than the spacing between the side frame members 141 of the seat portion, the legrest portion generally nests upwardly between the side frame members 141 when the legrest portion 136 is in the storage position.

Considering now the latchable hinge assembly 135 used for connecting the headrest and backrest portions, there is provided a bracket or plate 172 which is fixed to the end of the headrest portion 134 and which projects forwardly so as to overlap the upper edge of the backrest portion 132, which bracket 172 is connected to the upper edge of the backrest portion 132 by a horizontal hinge pin 171. This hinge pin 171 enables the headrest portion to be stored behind the backrest portion as illustrated by solid lines in FIG. 7, or enables the headrest portion to be swung upwardly so as to project upwardly from the headrest portion in slightly forwardly spaced relationship therefrom, as indicated by dotted lines in FIG. 12. The headrest can be locked in either of these positions by an elongate latching arm 174 which has a cross shaft 173 secured to the upper end thereof, which cross shaft is pivotally supported on and extends between the brackets 172 disposed adjacent opposite sides of the headrest, with opposite ends of the cross shaft 173 being fixedly secured to the latch arms 174 disposed on opposite sides of the headrest. Each latch arm 174 adjacent the other end thereof is provided with a generally L-shaped slot 175 therein in which is slidably accommodated a pin 176 which projects outwardly from the side frame element of the backrest portion at a location spaced downwardly a small distance from the upper edge thereof. This pin 176 engages the short transversely extending leg of the L-shape slot 175 when the headrest is in either the stored or upright positions to hold the headrest in this position. However, the L-shaped slot 175 accommodates slidable relative movement of the pin 176 therein during swinging of the headrest portion between the storage and upright positions.

Figure 7:
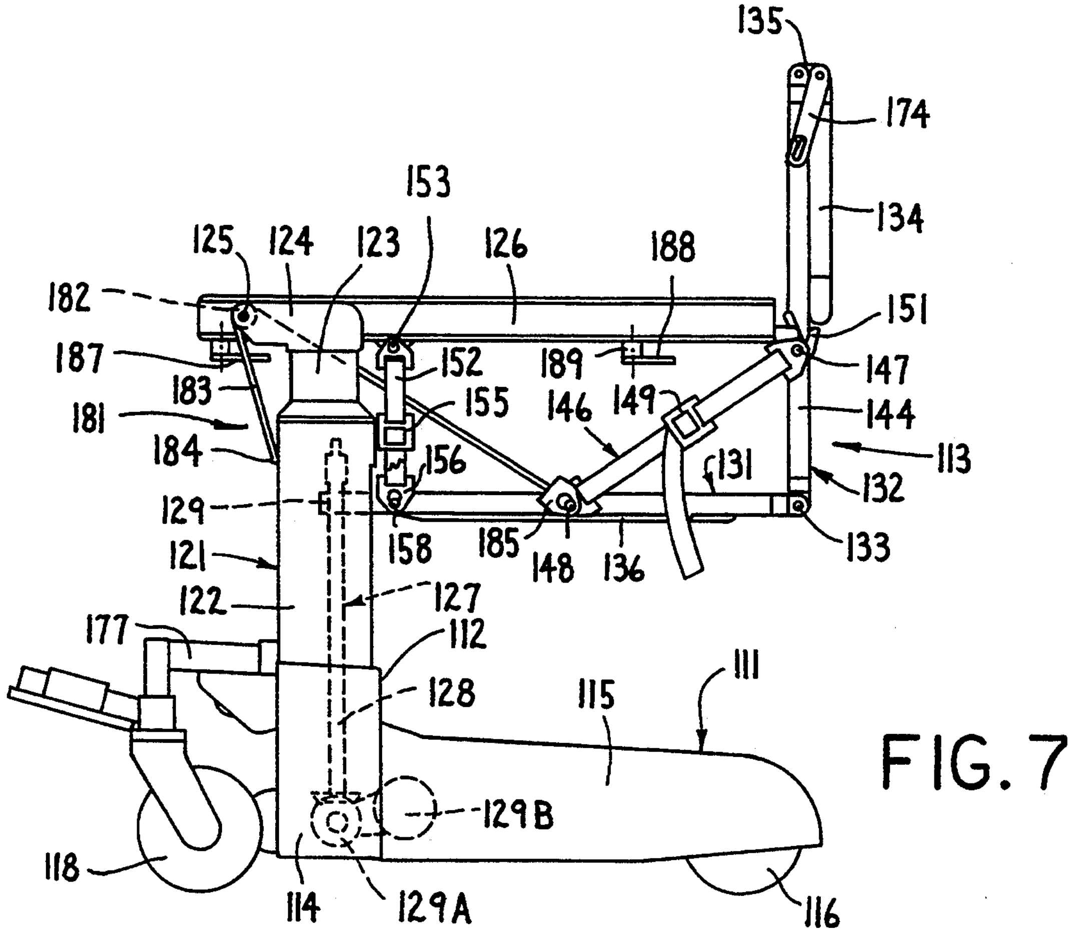
FIG. 7 is a side elevational view similar to FIG. 3 but illustrating a second and preferred embodiment of the invention.

The transporter 110 of this invention also has a stretcher activating means 181 associated therewith for automatically moving the seat/stretcher assembly 113 from the seat position shown by solid lines in FIG. 7 into the aligned stretcher position indicted by FIG. 8 in response to raising of the assembly 113 as the extendible post assemblies 121 are extended from their lowermost positions to their uppermost positions, and vice versa. This stretcher activating means 181 includes a small pulley 182 which is rotatably supported on the inner side of each support arm 126 adjacent the front end thereof, which pulley in the illustrated embodiment is rotatably supported on the inner end of the hinge pin 125. Each pulley 182 has an elongate flexible cable 183 disposed thereover, which cable projects downwardly in front of the pulley and has one free end thereof anchored at 184 to the respectively adjacent lower post 122. This anchor 184 may comprise a releasable hook provided on the free end of the cable and releasably engageable with an eyelet of similar structure provided on the lower post. This cable 183, after passing upwardly from the anchor 184 and passing over the pulley 182, has another elongate portion which terminates in another free end provided with a bracket or clip 185 secured thereto. This clip 185 is identical to the clip 156 illustrated in FIG. 10. The clip 185 again has a keyhole-shaped slot therethrough which enables it to be selectively pivotally coupled to the securing pin 138 which projects sidewardly from the side frame member of the seat portion 131. The clip 185, during normal use of the transporter as a wheelchair, is not coupled to the securing pin 138, but rather is merely loosely supported, such as by being loosely hooked to the front portion of the cable, so as to not interfere with desired raising and lowering of the seat assembly 113. However, when conversion of the seat assembly into a stretcher assembly is desired, then the clip 185 is engaged with the pin 138, which engagement can occur only when the seat assembly is at or closely adjacent its lowermost position (i.e., the post assemblies 121 are fully retracted). With the clip 185 engaged with the pin 138, then upward extension of the post assemblies 121 results in the seat assembly 113 being unfolded and raised upwardly into the stretcher configuration, as explained in greater detail hereinafter.

To support the stretcher assembly in the raised position, each arm 126 is provided with front and rear seat-engaging support arms 187 and 188, respectively. The front support arm 187 is disposed adjacent the front end of the arm 126 and is disposed thereunder and joined thereto by a vertically-extending hinge pin 189 which enables the front support arm 187 to be swingably moved from a storage position wherein it is aligned under the arm 126 into a use position wherein it projects perpendicularly inwardly of the arm 126 so as to be positioned directly under the front corner of the seat portion 131 when the latter is in the stretcher position. Similarly, the rear support arm 188 is supported by a similar hinge pin 189 so as to be disposed under the arm 126 at a location more closely adjacent but spaced forwardly from the rearward free end thereof, with this rear support arm 188 also normally being stored in aligned relation under the arm 126 and being swingable so as to project perpendicularly inwardly so as to project under the rear corner of the seat portion 131 when the latter is in the stretcher position. Each of these support arms 187, 188 has a suitable ball detent (not shown) thereon which cooperates with the underside of the arm 126 to hold the support arm 187, 188 in either the retracted or use position.

The use and activation of the transporter 110 will now be briefly described.

The transporter 110 will often be used in a wheelchair configuration similar to that illustrated in FIG. 7. In this position, the seat/stretcher assembly 113 is configured as a seat assembly and can be suitably raised and lowered by suitable extension and contraction of the post assemblies 121. When use of the headrest 134 is desired, then the headrest is pivotally swung upwardly into the upright position and latched in such position by the latch arms 174. Similarly, if use of the legrest 136 is desired, then the post assemblies 121 are energized and extended upwardly so as to raise the seat assembly substantially to an uppermost position. The assistant can then manually release the lock pins 165 by withdrawing them from the rear lock holes 167, following which the legrest portion 136 is swung downwardly and then upwardly in a forward direction through an angle of 180° until the legrest portion projects generally outwardly in substantially aligned relationship from the front edge of the seat portion 131. The legrest portion 136 is then locked in this use position by allowing the lock pins 165 to be spring-urged into the front lock holes 166. The overall seat assembly can then be lowered to the desired elevation by retraction of the post assemblies 121.

With the legrest in the raised use position as described above, the wheelchair configuration can also be used in conjunction with a standard toilet by moving the wheelchair backwardly in straddling relationship to a standard toilet so that the opening 143 in the seat portion is aligned above the toilet, and then lowering the seat assembly (by retraction of the post assemblies 121) until the seat portion 131 is resting substantially on top of the toilet.

When conversion of the transporter 110 from a wheelchair (FIG. 7) into a stretcher (FIG. 8) is desired, then the post assemblies 121 are energized and retracted so as to initially position the seat assembly in the lowermost position. Prior thereto, the legrest 136 assembly is typically moved and latched in the open extended use position. The headrest 134 is also typically moved upwardly and latched into its use position wherein it projects upwardly from the backrest portion 132. The clips 185 associated with the stretcher activating means are then engaged with the securing pins 138 which project from opposite sides of the seat portion 131. The buckle 149 associated with each flexible side support 146 is then loosened so as to permit the length of each side support 146 to be increased, which increase in length can be controlled by the operator or assistant grasping the free end of the belt which projects from the buckle. The drive motor is then energized so as to extend the post assemblies 121 upwardly, which in turn causes upward displacement of the pulleys 182. This tensions the cables 183 and, as the pulleys 182 move upwardly, causes lifting forces to be imposed on the pins 138 secured to the seat portion 131. This causes the seat portion 131 to be lifted upwardly, and causes a corresponding vertical hinging of the backrest portion 132 about the hinge pins 136. This causes the hinge 133 to be moved upwardly and forwardly, and causes a corresponding forward displacement of the seat portion 131 (and the attached legrest portion) as the latter are lifted upwardly. This movement continues such that, when the post assemblies 121 reach their fully extended and hence uppermost positions, the seat assembly 131 has been lifted upwardly and shifted forwardly so as to be substantially horizontally aligned with the backrest portion 132 which is now generally horizontally oriented, with these aligned portions 131 and 132 being disposed at an elevation which approximately corresponds to the lower edges of the support arms 126. During this upward movement, the seat portion 131 remains horizontal since the hinges 133, 136, 146 and 148 effectively define a parallelogram and maintain the desired horizontal relationship of the seat portion as the upward swinging movement occurs about the upper hinges 146 and 136. This also results in the seat portion 131 being shifted forwardly a significant extent so as to project into and forwardly through the front opening defined between the post assemblies 121, with the center of the seat portion 131 now being disposed more closely adjacent the front of the base 111 and specifically more closely adjacent the region directly between the front post assemblies 121. This is clearly illustrated by FIGS. 7 and 8 since, in the seating position of FIG. 7 the hinge 133 is disposed closely adjacent the rearward ends of arms 126 when viewed in the front-to-back direction, whereas in the stretcher position of FIG. 8 the hinge 133 is disposed substantially midway between the front and rear ends of arms 126. This forward shifting hence results in the center of gravity of the patient as lying on the stretcher being shifted forwardly so as to be more centrally disposed over the base as the seat/stretcher assembly 113 is moved from the seat configuration of FIG. 7 into the stretcher configuration of FIG. 8. This provides for significantly increased safety and stability with respect to the patient who is positioned on the stretcher.

After the assembly 113 has been moved into the stretcher position illustrated by FIG. 8, then the support arms 187 and 188 as associated with each side of the transporter are manually pivoted perpendicularly inwardly from the respective arm 126 so as to be disposed directly under the respectively adjacent front and rear corners of the seat portion 131. This thus enables the load of the stretcher to be transmitted directly to these support arms 187, 188, and enables the tension in the cables 183 to be relieved if desired by effecting slight downward retraction of the post assemblies 121.

During the upward raising of the seat assembly, the flexible side supports 146 can be gradually lengthened by the assistant so as to accommodate the gradual opening of the angle between the seat and backrest portions 131 and 132. By gradually lengthening these straps 146, this still maintains a positive structural connection between the seat and backrest portions sufficient to support them in the newly-raised position, independent of the lifting force imposed by the cables.

When the assembly 113 is in the stretcher position, the arms 126 are disposed closely adjacent opposite sides of the stretcher and project upwardly a small extent above the stretcher to assist in sidewardly confining the patient on the stretcher.

The transporter is reconverted from a stretcher back to a wheelchair using a sequence of operations which is substantially the reverse of the sequence described above.

In addition to my aforementioned earlier U.S. Pat. No. 5,112,076, attention is also directed to my copending U.S. application Ser. Nos. 07/749,153 and 07/790,219 (now U.S. Pat. Nos. 5,255,934 and 5,201,377) which disclose improvements associated with wheelchairs. The disclosure of these latter applications and patent are incorporated herein by reference since they do disclose therein, in detail, some of the structural and operational features incorporated into the transporter of this invention.

The transporter of this invention can be either manually propelled, or the rear wheels can be power driven through a suitable drive mechanism, examples of which are disclosed in the above applications and patent.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A patient or invalid transporter, comprising:

a wheeled base;

a pair of vertically extendible uprights mounted on and projecting upwardly from said base adjacent opposite sides thereof, each said upright including a lower part fixed to said base and an upper part vertically movably supported on the lower part, said upper parts defining a pair of generally parallel and horizontally elongate arms disposed adjacent opposite sides of said transporter;

drive means coupled to said uprights for causing synchronous vertical raising or lowering of said upper parts, including said arms, between raised and lowered positions;

a seat assembly supported by said upper parts, said seat assembly including seat and backrest portions joined at adjacent edges by a horizontal hinge, said seat portion when in a seating position being disposed generally between but spaced downwardly a predetermined distance below said arms;

support means pivotally connected between said upper parts and said seat assembly for normally supporting said seat assembly in said seating position wherein said seat portion is disposed downwardly a substantial distance below said arms and said backrest portion projects upwardly in transverse relationship from adjacent a rear edge of said seat portion, said support means and said seat assembly defining a four-point pivotal support arrangement disposed adjacent each side of said seat assembly for permitting said seat assembly to be vertically displaced from said seating position into a raised stretcher position wherein the seat and back portions are both disposed in generally horizontally aligned relationship within a substantially single horizontal plane disposed at an elevation closely adjacent said arms with said four-point pivotal support arrangement causing said seat portion to be both vertically raised and linearly shifted horizontally forwardly relative to said base during movement from said seating position to said stretcher position;

means cooperating between said upper parts and said seat assembly for maintaining said seat assembly in said stretcher position; and a seat/stretcher converting mechanism coacting between said seat assembly and said uprights for effecting automatic vertical movement of said seat assembly from said seating position to said stretcher position in response to vertical raising of the upper parts of said uprights.

2. A transporter according to claim 1, wherein said seat assembly includes a legrest portion hingedly connected to said seat portion adjacent a front edge thereof and swingably movable between a storage position wherein said legrest portion is disposed substantially directly under said seat portion and a use position wherein the legrest portion is disposed generally horizontally and projects outwardly from adjacent the front edge of said seat portion in approximately aligned relationship therewith.

3. A transporter according to claim 2, wherein said seat assembly includes a headrest portion which is pivotally interconnected at one edge thereof to an upper edge of said backrest portion and is pivotally movable between a storage position wherein the headrest portion is disposed directly rearwardly of said backrest portion and a use position wherein the headrest projects generally outwardly away from said backrest portion in generally parallel and approximately aligned relationship therewith.

4. A transporter according to claim 1, wherein said converting mechanism includes a flexible elongate cable member having one end anchored to said seat portion and the other end anchored to said upright.

5. A transporter according to claim 4, wherein the other end of said cable member is anchored to one of said upper and lower parts and an intermediate portion of said cable member is engaged with and at least partially wrapped around a cable guide member which is mounted on the other of said upper and lower parts.

6. A transporter according to claim 5, wherein said one end of said cable member is releasably engaged with said seat portion, and wherein the other end of said cable member is anchored to said lower part, and said guide member is mounted on said upper part substantially at the elevation of said arm.

7. In a wheelchair assembly having a frame structure rollingly supported by a plurality of wheels, and a seat assembly supported from said frame structure for accommodating an occupant therein, said seat assembly including a generally horizontally enlarged seat portion joined adjacent a rear edge thereof to an upwardly projecting backrest portion, comprising the improvement wherein the seat portion has an enlarged vertically extending opening formed centrally therethrough and adapted for disposition over a toilet, a closure structure positioned in a storage position directly under said seat portion and including an upwardly projecting part which projects into and fills said opening when said closure structure is in said storage position, said closure structure being hingedly joined to said seat portion adjacent one edge thereof and swingable downwardly away from said storage position so as to open up said opening when it is desired to position the seat portion over a toilet, said closure structure comprising a generally horizontally enlarged legrest portion which is pivotally coupled to said seat portion adjacent a front edge of the seat portion and is Swingable from said storage position into a use position wherein the legrest portion projects forwardly of said seat portion, and releasable latch means cooperating between said closure structure and said seat portion for normally maintaining said closure structure in said storage position.

8. A wheelchair assembly according to claim 7, wherein said releasable latch means includes means for normally maintaining said closure structure in said use position.

9. A wheelchair assembly according to claim 8, including vertical lifting means cooperating between said seat assembly and said frame structure for permitting vertical raising of said seat assembly into an elevated position when swinging movement of said closure structure away from said storage position is desired.

10. A patient or invalid transporter, comprising:

a base having front and rear wheels;

a pair of vertically extendible uprights mounted on and projecting upwardly from said base adjacent opposite sides thereof, each said upright including a lower part fixed to said base and an upper part vertically movably supported on the lower part, said upper parts defining a pair of generally parallel and horizontally elongate arms disposed adjacent opposite sides of said transporter;

drive means coupled to said uprights for causing synchronous vertical raising or lowering of said upper parts, including said arms, between raised and lowered positions;

a seat assembly supported by said upper parts, said seat assembly including seat and backrest portions joined at adjacent edges by a horizontal hinge, said seat portion when in a seating position being disposed generally between but spaced downwardly a predetermined distance below said arms;

support means pivotally connected between said upper parts and said seat assembly for normally supporting said seat assembly in said seating position wherein said seat portion is disposed downwardly a substantial distance below said arms and said backrest portion projects upwardly in transverse relationship from adjacent a rear edge of said seat portion, said support means and said seat assembly defining a four-point pivotal support arrangement disposed adjacent each side of said seat assembly for permitting said seat assembly to be vertically displaced from said seating position into a raised stretcher position wherein the seat and back portions are both disposed in generally horizontally aligned relationship within a substantially single horizontal plane disposed at an elevation closely adjacent said arms with said four-point pivotal support arrangement causing said seat portion to be both vertically raised and linearly shifted horizontally forwardly relative to said base during movement from said seating position to said stretcher position;

said four-point pivotal support arrangement including a first pivot connected between said arm and said backrest portion, said first pivot being fixedly positioned relative to said arm and connected to said backrest portion at a location spaced a predetermined distance upwardly from the horizontal hinge which joins the seat and backrest portions together, said horizontal hinge defining a second pivot of said four-point pivotal support arrangement, said first pivot being spaced vertically upwardly a substantial distance above and substantially directly over said second pivot when said seat assembly is in said seating position, said second pivot being moved horizontally forwardly of said rear wheels when the seat assembly is in said stretcher position, said second pivot being disposed substantially over the rear wheels of said base when the seat assembly is in said seating position, and said first pivot being disposed substantially directly vertically over said rear wheels of said base when said seat assembly is in both said seating and stretcher positions; and means cooperating with said upper parts and said seat assembly for maintaining said seat assembly in said stretcher position.

11. A transporter according to claim 10, wherein said support means includes an elongate connecting element having one end joined by a third hinge to said upper part and the other end joined by a fourth hinge to said seat portion, said fourth hinge being spaced forwardly from said second hinge, said third and fourth hinges being part of said four-point pivotal support arrangement.

12. A patient or invalid transporter, comprising:

a wheeled base having front and rear ends;

an upright structure mounted on and projecting vertically upwardly from said base;

a seat assembly movably supported solely by said upright structure and including seat and backrest portions having adjacent edge portions joined by a horizontal hinge arrangement, said backrest portion projecting upwardly from said seat portion adjacent a rear edge thereof when said seat assembly is in a seating position, said seat assembly being oriented toward the front end of the base when in the seating position;

support means movably supporting said seat assembly on said upright structure for vertical movement of the seat assembly in its entirety from said seating position into a stretcher position wherein the seat and backrest portions are both disposed in generally horizontally aligned relationship within a substantially single horizontal plane with said support means causing said seat portion to be linearly shifted horizontally forwardly relative to said base and said backrest portion to be solely vertically swingably moved into said horizontal plane during movement from said seating position to said stretcher position; and first releasable means cooperating with said seat assembly when in said seating position for preventing movement of said seating assembly into said stretcher position, said first releasable means being disengageable for permitting the seat assembly to be moved into said stretcher position; and second means releasably engageable with said seat assembly when the seat assembly is in said stretcher position for maintaining the seat assembly in said stretcher position.

13. A transporter according to claim 12, wherein said upright structure includes a lower part fixed to said base and an upper part which is vertically extendible and contractible relative to said lower part, and power drive means cooperating with said upright structure for permitting raising and lowering of the upper part, said seat assembly being supported solely by said upper part.

14. A transporter according to claim 13, including seat/stretcher converting means coupled between said lower part, said upper part and said seat assembly for causing said seat assembly to automatically move from said seating position to said stretcher position in response to raising of said upper part.

15. A transporter according to claim 12, wherein said second means includes supporting members movably mounted on said upright structure adjacent opposite sides of said seat assembly and movable relative to said upright structure from a release position into a position of supportive engagement with the seat assembly when the seat assembly is in said stretcher position for maintaining the seat assembly in said stretcher position.

16. A transporter according to claim 12, wherein said upright structure includes a pair of generally parallel and horizontally elongate arms disposed adjacent opposite sides of the seat assembly, said arms being positioned upwardly from the seat portion of the seat assembly when the seat assembly is in said seating position, said seat assembly when in said stretcher position being disposed at an elevation which closely approximates the elevation of the arms, and said second means including supporting members movably mounted on said arms and movable relative thereto into a position of vertical supportive engagement with opposite sides of the seat assembly when said seat assembly is in said stretcher position.

17. A transporter according to claim 16, wherein said supporting members comprise leverlike elements which are swingably supported on the arms and are swingable inwardly so as to project beneath and supportingly engage opposite sides of the seat portion when the seat assembly is in said stretcher position.

18. A transporter according to claim 12, wherein said horizontal hinge arrangement defines a first horizontal hinge defined substantially at adjacent edges of said seat and backrest portions, said first horizontal hinge being disposed substantially over rear wheels of said base when the seat assembly is in said seating position, said first horizontal hinge being moved horizontally forwardly of said rear wheels when the seat assembly is in said stretcher position, said support means including a second horizontal hinge which is parallel to said first hinge and hingedly connects said backrest portion to said upright structure, said second horizontal hinge being connected to said backrest portion at a location whereby said second horizontal hinge is spaced vertically upwardly a substantial distance above and substantially directly over said first horizontal hinge when said seat assembly is in said seating position, said second horizontal hinge being disposed substantially directly vertically over said rear wheels of said base when said seat assembly is in both said seating and stretcher positions.

19. A wheelchair for transporting an invalid or handicapped person, comprising:

a wheeled base assembly including a generally U-shaped rearwardly-opening base having a pair of elongate side legs which are cantilevered rearwardly and are sidewardly spaced apart to define an open region therebetween so that said base assembly can be moved rearwardly in straddling relationship to a conventional toilet;

a pair of vertically extendible uprights mounted on and projecting upwardly from said base assembly adjacent opposite sides thereof, each said upright including a lower part fixed to said base and an upper part vertically movably supported on the respective lower part, said upper parts defining at upper ends thereof a pair of generally parallel and horizontally elongate arms disposed adjacent opposite sides of said wheelchair;

drive means cooperating with and coupled to said uprights for causing synchronous vertical raising or lowering of said upper parts, including said elongate arms, between raised and lowered positions;

a seat assembly supported by said upper parts of said uprights, said seat assembly including seat and backrest portions joined at adjacent edges by a horizontal hinge, said seat portion when in a seating position being disposed generally between but spaced downwardly a predetermined distance below said arms;

said seat portion including a horizontally enlarged seat member which defines thereon an upper surface which is provided for engaging and supporting an occupant of the seat assembly, said enlarged seat member having a large opening positioned generally centrally thereof and extending vertically therethrough for permitting said seat member to be positioned directly over and used in conjunction with a conventional toilet without requiring removal of the occupant from the wheelchair;

said seat portion also including a movable seat part supported on said seat member for swinging movement relative thereto between an open position wherein the seat part is positioned outwardly adjacent one side of the seat member and a closed position wherein the seat part is positioned generally under said seat member and within said central opening for closing said opening; and said movable seat part including a projecting part which, when in said closed position, projects upwardly into and substantially fills said central opening, said projecting part defining thereon an upper surface which is substantially coplanar with the upper surface of the seat member for supporting the occupant, said movable seat part including a support structure which is fixed to said upwardly projecting part and is disposed generally below the seat member when the movable seat part is in said closed position, said support structure being hingedly connected to said seat member for swinging movement relative thereto about a generally horizontally extending hinge which is disposed adjacent one edge of said seat member for permitting said movable seat part to be swingably moved downwardly from said closed position and thence outwardly into said open position wherein said moveable seat part is disposed laterally from the region directly below the seat member so as to avoid interfering with the toilet.

20. A wheelchair according to claim 19, including support means pivotally connected between said upper parts and said seat assembly for normally supporting said seat assembly in said seating position wherein said seat portion is disposed downwardly a substantial distance below said arms and said backrest portion projects upwardly in transverse relationship from adjacent a rear edge of said seat portion, said support means and said seat assembly defining a four-point pivotal support arrangement disposed adjacent each side of said seat assembly for permitting said seat assembly to be vertically displaced from said seating position into a raised stretcher position wherein the seat and back portions are both disposed in generally horizontally aligned relationship within a substantially single horizontal plane disposed at an elevation closely adjacent said arms with said four-point pivotal support arrangement causing said seat portion to be both vertically raised and linearly shifted horizontally forwardly relative to said base during movement from said seat assembly into said stretcher position.

21. A wheelchair assembly according to claim 8, wherein said central opening is of an oval shape and is spaced inwardly in its entirety from outer peripheral edges of said seat portion, said legrest portion including a horizontally enlarged and substantially planar legrest support surface which has transverse and longitudinal dimensions which substantially exceed corresponding transverse and longitudinal dimensions of the central opening, said legrest support surface being oriented downwardly when the legrest portion is in the storage position beneath the seat portion, and said upwardly projecting part being of a generally oval cross section corresponding to the oval shape of said central opening and projecting upwardly from the legrest portion into the central opening so as to fill said opening and define a substantially continuous upper seating surface on said seat portion, said projecting part being oriented downwardly when the legrest portion is in said use position.

* * * * *